United States Patent [19]

James

[11] 3,724,888
[45] Apr. 3, 1973

[54] SPRING-BIASED LATCHING DETENT

[75] Inventor: Michael Joseph James, Cheltenham, England

[73] Assignee: Micro & Precision Mouldings (Cheltenham) Limited, Cheltenham, England

[22] Filed: Mar. 24, 1971

[21] Appl. No.: 127,641

[30] Foreign Application Priority Data

Mar. 24, 1970 Great Britain ................14058/70

[52] U.S. Cl. ...............................................292/74
[51] Int. Cl. ..............................................E05c 19/02
[58] Field of Search.......292/DIG. 38, 74, 75, 76, 70, 292/163, 87, 175; 339/252 P, 255; 16/85

[56] References Cited

UNITED STATES PATENTS

| 2,187,099 | 1/1940 | Rodemeyer | 16/142 |
| 3,563,584 | 2/1971 | Schwartzman | 292/74 X |
| 381,792 | 4/1888 | Jones | 292/74 |
| 1,784,936 | 12/1930 | Kimbell | 292/74 |
| 362,805 | 5/1887 | Williams | 292/175 |
| 1,918,924 | 7/1933 | O'Heir | 16/85 |

Primary Examiner—Richard E. Moore
Attorney—Young & Thompson

[57] ABSTRACT

An assembly such as a door catch has two relatively movable members, one of the members having a projecting resilient arm and the other having a ramp-like surface along which the arm travels. The result is that the resilient arm deflects during relative movement of the members in one direction and the flexing of the arm produces a return force acting between the members and in the opposite direction.

3 Claims, 4 Drawing Figures 3,724,888

SPRING-BIASED LATCHING DETENT

This invention relates to means for resiliently loading two members, whereby to oppose relative movement of the members in one direction and provide a consequent return force acting in the opposite direction.

According to one aspect of the invention, in an assembly of two relatively movable members one of the members has a projecting resilient arm and the other has a ramp-like surface along which the arm travels with resultant deflection of the arm during relative movement of the members in one direction, the flexing of the resilient arm producing a return force acting between the members and in the opposite direction.

Preferably the two members fit telescopically one within the other, with a sliding fit which guides said relative movement. The resilient arm may be one of a plurality of resilient tongue-like projections angularly distributed around the inner member and engaging said ramp-like surface, which surface is desirably a surface of revolution formed within the outer member and centered on the telescopic axis. Preferably at least two arms are provided which are diametrically opposed in order to provide a balanced reaction on the members radially of said axis.

Both members may be integral plastics mouldings and they may be formed for snap engagement one within the other so that on assembly the inner member is retained captive within the other. The invention is of special application to a simple catch, for example for a cupboard door or the like, with the outer member providing the catch housing and the inner member the movable catch member for engagement with a suitable keeper on door closure.

Thus, according to another aspect of the invention a two-part door catch comprises a housing member of generally annular tubular form, an inner catch member slidably mounted telescopically within the housing member, the catch member being retained captive within the housing member and urged to a resting position where it projects from an open end of the housing member which, towards its other end, is formed with an internal ramp-like surface engaged by a projecting resilient arm of the catch member, so that on inward movement of the catch member into the housing member the arm travels along the surface and the resultant flexing of the arm provides a return force acting between the members to urge the catch member back to said resting position.

Although the ramp-like surface may be of generally frusto-conical shape it is preferably contoured to provide a desired characteristic for the resilient force, for example to provide a force corresponding to that produced by a constant rate spring. This is particularly desirable when the invention is applied to a simple two-part door catch. The surface may be concave so that the resilient arm or arms deflect inwardly as the inner member moves into the outer member against the resilient return force; alternatively it may be convex so that the arm or arms deflect outwardly as a result of such movement.

Two embodiments of the invention, each in the form of a two-part door catch, are illustrated in the accompanying drawings and will now be described with reference thereto and by way of example. In the drawings.

Figure 1:
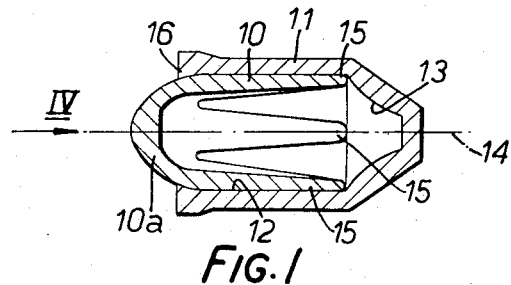
FIG. 1 is a longitudinal sectional view of one of the embodiments.

In both embodiments an inner catch member 10 and an outer housing member 11 are each moulded from a resilient plastics material. The housing member 11 is of tubular form with a cylindrical bore 12 which terminates at the inner end at a ramp-like surface 13 or 13a which is a surface of revolution about the bore axis 14 and which, in cross-section as shown, has a convex generally arcuate profile. The catch member 10, which slides telescopically within the bore 12, has a rounded and internally hollow nose portion 10a from which integral tongues 15 or 15a project inwardly of the housing member 11 to provide resilient arms which are equiangularly distributed around the axis 14. Each of these arms 15, 15a is of generally triangular tapering shape with the apices of the triangles flattened and radiused off.

At its open outer end the housing member 11 has an internal peripheral lip 16, so that the catch member 10 snaps into the housing member 11 with its generally spherical nose portion 10a projecting and the inner ends of the arms 15 or 15a just engaging the ramp surface 13 or 13a.

Referring now specifically to the embodiment of FIG. 1, four arms 15 are provided arranged in diametrically opposed pairs with the bases of the triangles completely spanning the periphery of the catch member 10. The arms are as moulded inclined slightly outwardly in the radial sense so that they have to be pressed inwardly by a slight amount on assembly of the catch to fit into the bore 12 in the housing member 11, which bore they thus engage resiliently. This provides firm location of the catch member 10 about the axis 14, and also preloads the catch member 10 by providing an initial force as soon as the ramp surface 13 is engaged by the arms 15.

As the catch member 10 is urged into the housing member 11 on door closure the arms 15 ride inwardly along the ramp surface 13 and are thus flexed inwardly in the radial sense, the resulting bending moment providing a resilient return force on the catch member 10. The described profile of the ramp surface 13 provides the desired return force characteristic, which approximates to a constant rate spring, in a simple two-part catch which has the advantage that it does not require a separate spring. Thus the cost of a spring is saved, and assembly is simplified as it merely consists of snapping together the two members 10 and 11. Adjacent its free end each of the arms 15 is moulded with a small outer and laterally disposed rib (not shown) which engages the ramp surface 13 to provide substantially line contact therewith.

Figure 3:
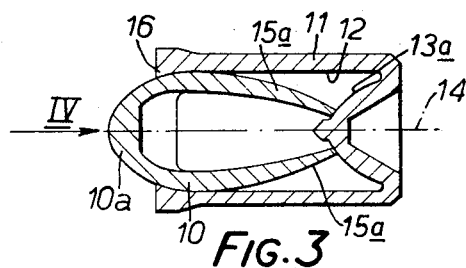
FIG. 3 is a view similar to that of FIG. 1, of the other embodiment.
Figure 4:
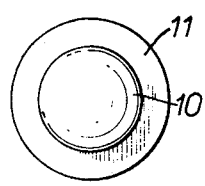
FIG. 4 is an end view of either embodiment as viewed in the direction of the arrow IV in FIG. 1 or 3.

The embodiment of FIG. 3 has two main differences, the first of these being that only a single pair of diametrically opposed arms 15a is provided. The other difference is that the ramp surface 13a, while again being a surface of revolution, is now of convex form and the arms 15a are inturned towards each other to engage the ramp surface which centers the inner end of the catch member 10 in the rest position illustrated.

Figure 2:
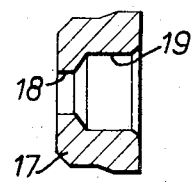
FIG. 2 is a corresponding sectional view of a keeper suitable for use with both embodiments.

The keeper used with either of the embodiments can be of any suitable form as used with ball and Bale's catches generally. In the example illustrated in FIG. 2, it is a simple cup-like plastics moulding 17 adapted to be recessed into an adjacent door frame structure. It is of annular form with a central screw-fixing hole 18 which is counterbored, at the outer end, to provide a recess 19 for engagement by the nose portion 10*a* of the catch member 10. This keeper shares, with both the described catches, the advantage that it is simply fitted into a plain hole of appropriate diameter bored into the frame structure, or the door as the case may be. No skilled or complex rebating of the frame or door is required.

It will be appreciated that instead of having a ramp surface of 13 or 13*a* formed as single surface of revolution common to all the arms 15 or 15*a*, this surface may equivalently be provided by a series of "flats" respectively engaged by the arms 15, 15a. These flats may be disposed chordally when viewed in sectional planes radial to the axis 14.

I claim:

1. An assembly of two relatively movable members wherein one of the members has a projecting resilient arm and the other has a concave ramp-like surface along which the arm travels with resultant deflection thereof during relative movement of the members in one direction, said deflection comprising inward flexing of the arm during said movement in said one direction, the flexing of the resilient arm producing a return force acting between the members and in the opposite direction.

2. An assembly of two relatively movable members wherein one of the members has a projecting resilient arm and the other has a convex ramp-like surface along which the arm travels with resultant deflection thereof during relative movement of the members in one direction, said deflection comprising outward flexing of the arm during said movement in said one direction, the flexing of the resilient arm producing a return force acting between the members and in the opposite direction.

3. A two-part door catch comprising a housing member of generally annular tubular form, an inner catch member slidably mounted telescopically within the housing member, the catch member being retained captive within the housing member and urged to a resting position where it projects from an open end of the housing member which, towards its other end, is formed with an internal curvate ramp-like surface engaged by a projecting resilient arm of the catch member, so that on inward movement of the catch member into the housing member the arm travels along the surface such that the portion thereof in engagement with said ramp-like surface is caused to follow an arcuate path and the resultant flexing of the arm provides a return force acting between the members to urge the catch member back to said resting position.

* * * * *